L. A. NAVONI.
AUTOMOBILE BUMPER.
APPLICATION FILED JULY 21, 1920.

1,414,300.

Patented Apr. 25, 1922.

Inventor:
Louis A. Navoni
By his Attorney
Pierre James

UNITED STATES PATENT OFFICE.

LOUIS A. NAVONI, OF SEATTLE, WASHINGTON.

AUTOMOBILE BUMPER.

1,414,300.  Specification of Letters Patent.  Patented Apr. 25, 1922.

Application filed July 21, 1920. Serial No. 397,880.

*To all whom it may concern:*

Be it known that I, LOUIS A. NAVONI, a citizen of the United States, residing at Seattle, in the county of King and State of Washington, have invented certain new and useful Improvements in Automobile Bumpers, of which the following is a specification.

My invention relates to that class of buffers known as automobile bumpers which are secured to the framework of motor vehicles and serve as fenders to overcome the effects of collisions.

The object of my invention is to provide a device of this character having greater efficiency and of less expensive construction than the automobile bumpers now commonly used.

The invention consists in the novel construction, adaptation and combination of parts as will be hereinafter described and claimed.

Figure 1:
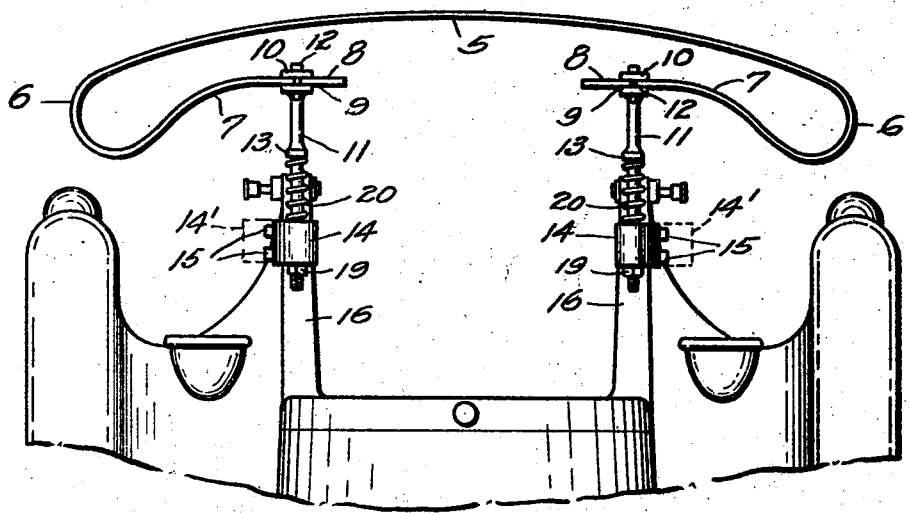
Figure 3:
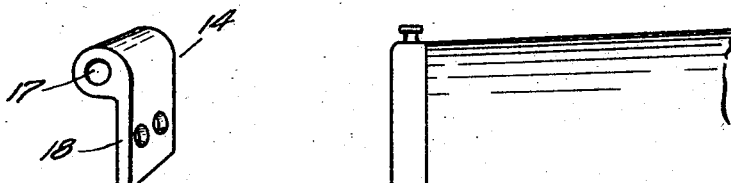
Figure 2:
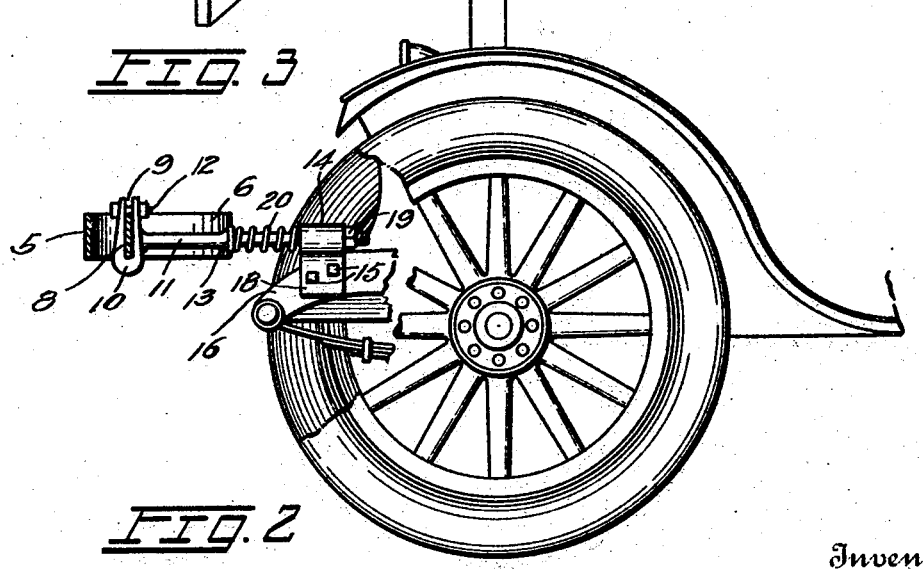

In the accompanying drawings, Figure 1 is a plan view of the front end of an automobile with the present invention applied thereto. Fig. 2 is a view of the same, shown partly in side elevation and partly in longitudinal vertical section. Fig. 3 is a perspective view of one of the frame attachments.

In carrying out the invention, I provide a resilient or spring metal bumper bar formed to furnish an arcuate shaped front portion 5 which is connected at the rear of each of its ends by a looped portion 6 and a curved portion 7 with inwardly directed ends 8.

The bar ends 8 are seated in transversely arranged slots 9 provided in the bifurcated heads 10 of bracket rods 11 and are retained therein by a bolt 12 extending through the bifurcations of each of the boltheads above the respective bumper ends 8 to afford relative transverse movements of the latter.

The bracket rods 11 are provided intermediate their lengths with collar elements 13 and to the rear thereof the rods 11 extend through apertures of attachments 14 which are rigidly secured by bolts 15 to the side bars 16 of an automobile chassis.

As shown in Fig. 3, each of the attachments 14, in transverse section, is of substantially the shape of a letter P with the aperture 17 to one side of the stem part 18.

By such devices, the bracket rods may be located at different distances apart by securing the attachments so that the offsets thereof will extend over the respective frame bars 16 as shown by full lines, or outwardly therefrom, as denoted by dotted lines 14¹ in Fig. 1.

The ends of the bracket rods are screw threaded to receive nuts 19 which are engageable against the rear sides of the respective attachments.

Between said attachments and the collars 13 are helical springs 20 which serve to normally retain the bumper bar in its most forward position and supplement the springlike action of the bumper bar itself in compensating substantially all shocks received by the bumper in collisions.

The peculiar shape of the bumper bar contributes to the efficiency of my invention by distributing the stresses due to shocks whether received in axial alignment with the travel of the automobile or otherwise.

The bracket rods are guided for axial movements in the frame attachments and serve to support the springs 20 which act to urge the bumper bar forward.

What I claim is,—

The combination of an arcuate shaped bumper having inwardly directed ends, attachments for the side bars of an automobile frame, each of said attachments being in transverse section of substantially the shape of a letter P and adapted to have its stem element rigidly secured to the respective frame bar, bracket rods extending through the laterally directed portions of the respective attachments, said rods being each provided at its front end with a head having a transverse slot to receive the bumper ends, bolts engaging the heads above said bumper ends to retain the bumper ends in the rod-head slots, springs provided upon said rods to yieldingly retain said bumper in its most forward position, and means adjustable upon said rods for regulating the effective power of said springs.

Signed at Seattle, Washington, this 14th day of July, 1920.

LOUIS A. NAVONI.

Witnesses:
PIERRE BARNES,
MARGARET G. SUPPLE.